J. REICHERT.
LAWN TRIMMING SHOVEL.
APPLICATION FILED JAN. 12, 1910.

962,785.

Patented June 28, 1910.

2 SHEETS—SHEET 1.

Witnesses

Inventor
John Reichert
By
Attorney

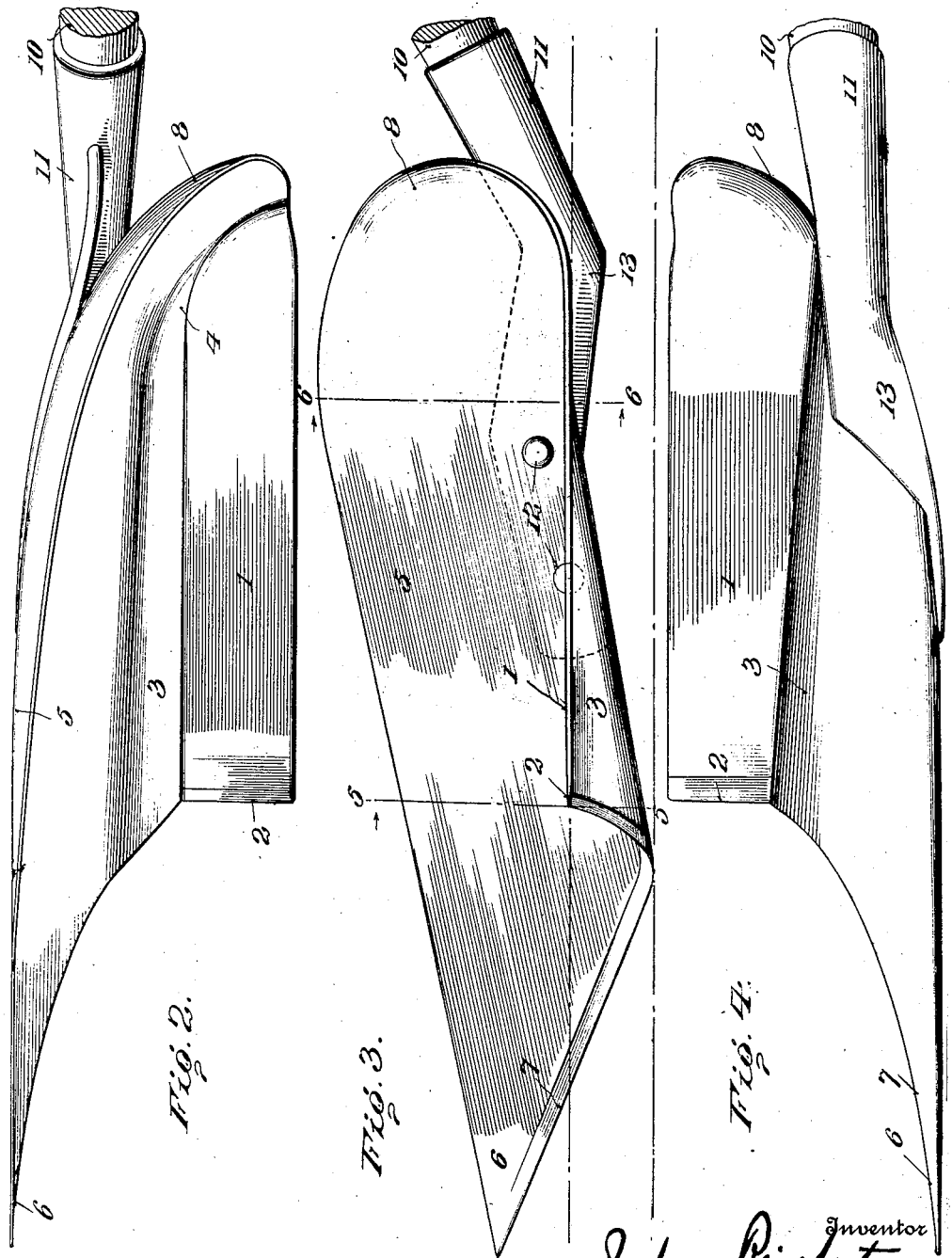

UNITED STATES PATENT OFFICE.

JOHN REICHERT, OF RACINE, WISCONSIN.

LAWN-TRIMMING SHOVEL.

962,785.  Specification of Letters Patent.  Patented June 28, 1910.

Application filed January 12, 1910. Serial No. 537,777.

*To all whom it may concern:*

Be it known that I, JOHN REICHERT, a citizen of the United States, residing at Racine, Racine county, Wisconsin, have invented certain new and useful Improvements in Lawn-Trimming Shovels; and I do hereby declare the following to be a full, clear, and exact description of the invention, such as will enable others skilled in the art to which it appertains to make and use the same.

This invention relates to certain improvements in shovels and more particularly to shovels peculiarly adapted for trimming the edges of lawns adjacent to side walks or the like; and the objects and nature of my invention will be readily understood by those skilled in the art in the light of the following explanation of the accompanying drawings illustrating what I now consider my preferred embodiment from among other formations and arrangements within the spirit and scope of my invention.

It is an object of the invention to provide certain improvements in formations and arrangements of parts whereby a highly efficient and improved lawn edge trimmer will be produced.

A further object of the invention is to provide certain improvements in lawn edge trimmers whereby the edges of lawns can be more accurately, easily and smoothly trimmed than heretofore and whereby the refuse can be accurately guided to and discharged onto the surface of the walk or roadway and at a distance from the edge along which the implement is being operated, and whereby the implement acts as a guard to prevent deposit of the refuse in the trench cut thereby or onto the adjacent edge of the lawn.

A further object of the invention is to provide improved means for joining together the implement shovel and its operating handle and whereby the shovel will be braced and strengthened and provided with a bottom shoe or wear surface.

The invention consists in certain novel improvements in combinations and in formations and arrangements of parts as more fully and particularly set forth hereinafter.

Figure 1:
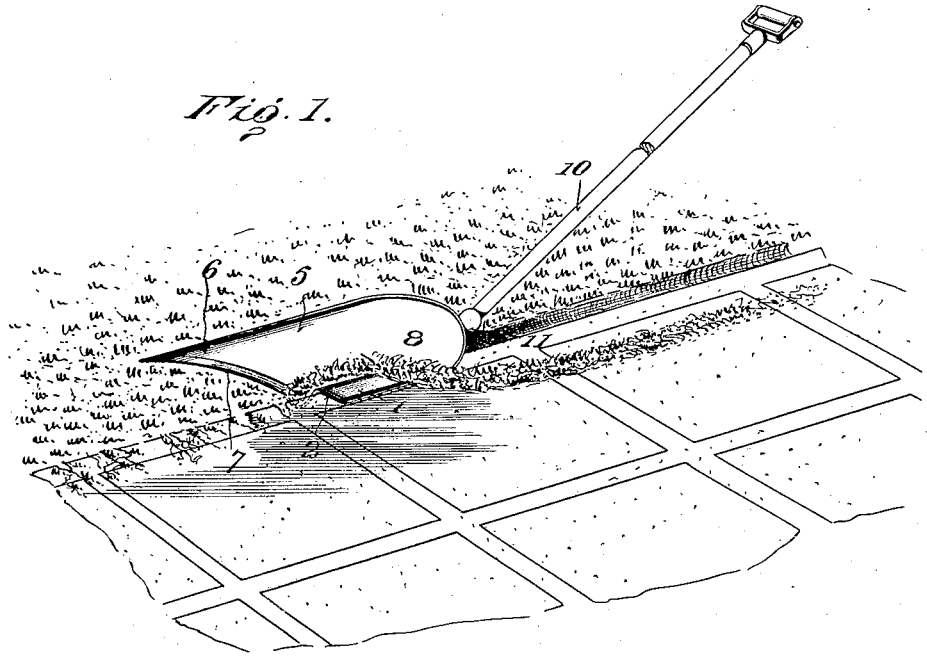
Figures 5, 6:
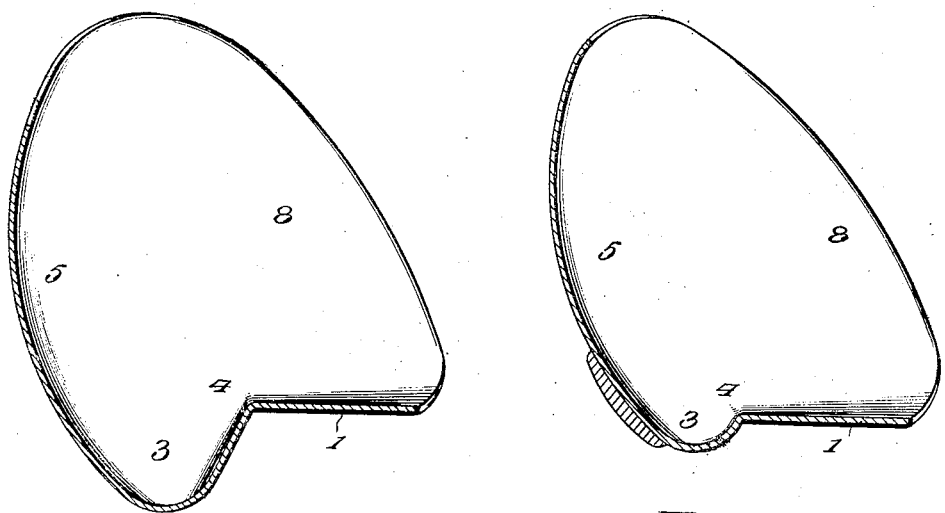

Referring to the accompanying drawings:—Figure 1, is a perspective view illustrating one manner of operating my improved implement. Fig. 2, is a top plan view thereof. Fig. 3, is a side elevation. Fig. 4 is a bottom plan. Fig. 5 is a cross section on the line 5—5, Fig. 3. Fig. 6 is a cross section on the line 6—6, Fig. 3.

The shovel or implement head is pressed or otherwise suitably formed preferably from one piece of sheet steel or other suitable material. Throughout a portion of its length and at one longitudinal edge thereof, the shovel is formed with the longitudinal flat horizontal floor, ledge or gage portion 1, adapted to slide and rest on the top surface of a side walk or the like adjacent to the lawn edge to be trimmed, and this gage portion at its front end is provided with a preferably straight transverse cutting edge 2, for removing grass and dirt from the top surface of the walk adjacent to the edge thereof. At the inner longitudinal edge of the gage portion 1, the shovel is formed with a longitudinal depression 3, U-shaped in cross section and longitudinally inclined downwardly and forwardly from the rear portion of the shovel so that the depression gradually decreases in depth from its front end to its rear end 4, where it rises to the level of and gradually merges into the rear end of the gage portion. The body of the shovel forms a longitudinal approximately vertical wall 5, at its lower longitudinal portion forming one wall of and merging into the longitudinal depression 3, and rising far above the same and above the level of the horizontal gage portion. The front end of this shovel body or wall projects far in advance of the depression and front end of the gage portion and forms a long forwardly projecting overhanging tapered point 6, having a lower cutting edge 7, inclined downwardly and rearwardly to the front edge of the floor of said depression, and said cutting edge is continued around the front end of the depression to join the inner end of the transverse cutting edge at the front end of said gage portion of the shovel. It will thus be noted that the front end of the shovel is preferably formed with a cutting edge continuous from the lower longitudinal edge (the outer longitudinal edge of the gage portion) of the shovel to the upper longitudinal edge (the top edge of the point 6) thereof, and that this cutting edge is preferably inclined throughout its length, except at the front edge of the gage portion, to secure a draw cut. From the inner end of the gage-portion cutting edge 2, the vertically disposed front cutting edge of the inner wall of the depression is inclined downwardly and forwardly and the inclination of the cutting edge is continued across the front edge of the floor of the depression and on upwardly and forwardly to the front extremity of the point 6.

The vertical body or guide or guard wall of the shovel extends longitudinally and rearwardly from the point extremity 6, and gradually curves inwardly (toward the gage portion) and rearwardly, thereby rearwardly narrowing the depression, while at its rear portion 8, said body is deflected on curved lines across the rear end of the implement to the inner side-wall edge thereof. The vertical wall or body of the shovel hence forms a mold board arranged longitudinally of the depression and extending transversely of the implement in rear of the depression and forming a curved or inclined rear wall in rear of the gage portion.

The implement is provided with an upwardly and rearwardly extending handle 10, at its lower front end secured in a socket 11, projecting upwardly and rearwardly from the rear end of the shovel head and from the mold board portion thereof in rear of the longitudinal depression of the shovel. This socket preferably forms part of a strong durable longitudinally elongated metal casting 11, or other block or body, longitudinally fitted in the exterior lower portion of the shovel head and rigidly secured thereto, as by rivets 12. The casting preferably fits the outer side of the rear portion of the shovel body or mold board and is recessed to fit beneath the rear end portion of the longitudinal depression and form a protective or wear shoe or heel 13 at the bottom of the rear of the shovel. This socket casting is so formed and arranged at the rear end of the shovel head as not to project outwardly beyond the vertical line of cut of the front point 6, and not to extend below the horizontal line of cut of the trench forming portion of the shovel.

In operation, the gage portion 1, rests on the top surface of the walk adjacent to the lawn edge to be trimmed and the front edge of the U-shaped depression cuts a trench along the edge of the walk in connection with the overhanging point which reaches far over forward and presses down the blades of grass, and the like and roots and shears them off against the surface of the ground. The inclined cutting edge acts with a shearing or draw cut on the ground in cutting the trench and in severing the vegetation. The refuse is carried rearwardly in the depression and is lifted by the inclined floor thereof, and guided by the mold board transversely across the portion 1, and deposited on the side walk at a safe distance from the trench. The portion 1, prevents the refuse falling into the trench and also gages the cutting depth of the implement.

An important feature of the invention resides in the long overhanging inclined point which presses down the grass etc. in advance of the cut and shears them off against the surface of the ground and prevents clogging of the implement and counteracts the downward pressure of the earth on the inclined floor of the trench cutting depression. The earth traveling up on the inclined floor of the trench forming depression tends to force the shovel down into the ground and cause it to tightly hug the side walk, but this tendency is counteracted by the inclined edge of the long overhanging point which riding on the ground and grass tends to lift the shovel and render the operation of the device easy and accurate. The implement by reason of this long overhanging point can be utilized for removing obnoxious weeds from lawns and also for digging around plants and working the edges of flower beds and the like.

It is evident that various modifications might be resorted to without departing from the spirit and scope of my invention and hence I do not wish to limit myself to the exact construction shown.

What I claim is:—

1. A trimming shovel comprising a longitudinal mold board, and a bottom wall formed with a gage portion and a trench cutting depression, the outer-longitudinal-side wall of said depression being formed by the lower portion of said mold board, the front edge of said mold board being inclined downwardly and rearwardly to the floor of said depression, the front edge of the inner-longitudinal-side wall of said depression being inclined upwardly and rearwardly from the floor of said depression and to the front edge of said gage portion.

2. A trimming shovel blade having a horizontally disposed bottom wall formed with trench cutting and gage portions, and an outer side longitudinal mold board at its front end, in advance of the transverse plane of the front edge of said bottom wall, projecting forwardly in the form of an elevated point to overhang the sod in advance of said trench cutting portion and formed with an elongated downwardly and rearwardly inclined lower shearing edge to ride on the sod in cutting in advance of said trench cutting portion and thereby tend to elevate the front end of said shovel against the downward pressure of the material on said trench cutting and gage portions, the front edges of said trench cutting and gage portions forming cutting edges in continuation of said shearing edge of the mold board point.

3. A trimming shovel blade composed of a longitudinal outer-side mold board projected forwardly in the form of an elevated point to overhang the sod, and a bottom wall formed with a gage portion and a longitudinal trench cutting depression having a front cutting edge, the outer longitudinal side wall of said depression being formed by the lower portion of said mold board, said point formed with a downwardly and rearwardly inclined shearing edge extending to the floor of said depression, said mold board curving rearwardly and inwardly to form a rear wall behind the gage portion and depression, substantially as described.

4. A trimming shovel blade composed of an outer side longitudinal mold board, and a bottom wall forming a longitudinal gage portion and a longitudinal trench cutting depression the outer side wall of which is formed by the intermediate lower portion of said mold board, said mold board being projected forwardly in advance of the bottom wall to form a long overhanging point having an elongated downwardly and rearwardly inclined cutting edge continued across the blade at the front edges of the gage and trench cutting portions to form the front edge of the blade as a continuous cutting edge, said mold board being curved from the point rearwardly and inwardly and extended to the inner edge of the blade to form a wall in rear of the gage and trench cutting portions, said trench cutting portion having its floor inclined upwardly and rearwardly and merging into said rear wall and gage portion.

5. A trimming shovel comprising a longitudinal rearwardly and inwardly inclined mold board and a bottom wall at the inner side thereof forming an intermediate longitudinal upwardly and rearwardly inclined trench cutting depression and an inner side gage portion, and a handle socket secured to said shovel and arranged in rear thereof and formed with a shoe arranged above the horizontal plane of the front edge of said depression and inwardly beyond the vertical plane of the front edge of said mold board so that said shoe travels in the trench cut by said shovel.

6. A trimming shovel comprising an outer side mold board and a bottom wall forming a longitudinal intermediate trench cutting depression and an inner side longitudinal gage portion, said mold board curved rearwardly and inwardly to form a rear wall behind said depression and gage portion, and a shoe-forming block secured to said shovel and extending under the bottom wall thereof and along the outer side of said mold board and provided with an upwardly and rearwardly projecting handle socket approximately in the longitudinal line of said depression.

In testimony whereof I affix my signature, in presence of two witnesses.

JOHN REICHERT.

Witnesses:
CHARLES SALBREITER,
JAMES S. ALLAN.